(12) United States Patent
Eibler

(10) Patent No.: US 11,365,766 B2
(45) Date of Patent: Jun. 21, 2022

(54) PROTECTIVE COVERING

(71) Applicant: MAGNA Powertrain GmbH & Co KG, Lannach (AT)

(72) Inventor: Gerhard Eibler, Heiligenkreuz a.W. (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 194 days.

(21) Appl. No.: 16/856,788

(22) Filed: Apr. 23, 2020

(65) Prior Publication Data
US 2020/0340535 A1    Oct. 29, 2020

(30) Foreign Application Priority Data

Apr. 24, 2019 (DE) .......................... 102019205870.1

(51) Int. Cl.
*F16D 3/84* (2006.01)
*F16H 57/02* (2012.01)
*F16H 57/029* (2012.01)

(52) U.S. Cl.
CPC .......... *F16D 3/841* (2013.01); *F16H 57/029* (2013.01)

(58) Field of Classification Search
CPC ............... F16D 3/841; F16H 57/029
See application file for complete search history.

(56) References Cited

U.S. PATENT DOCUMENTS

| | | | | |
|---|---|---|---|---|
| 3,071,079 A | * | 1/1963 | Henyon | F16N 13/20 418/188 |
| 7,178,425 B2 | * | 2/2007 | Marich | F16H 57/029 74/607 |
| 2016/0363207 A1 | | 12/2016 | McGarry et al. | |
| 2017/0009812 A1 | * | 1/2017 | Alcantara Burguete | F16C 33/723 |

FOREIGN PATENT DOCUMENTS

| | | | | |
|---|---|---|---|---|
| CA | 2462988 A1 | | 10/2005 | |
| CN | 103791068 A | * | 5/2014 | |
| CN | 104482175 A | * | 4/2015 | |
| CN | 108286603 A | * | 7/2018 | |
| DE | 706519 C | | 5/1941 | |
| DE | 4229283 C2 | * | 5/1996 | ........... B60K 17/344 |
| DE | 10233509 A1 | | 2/2004 | |

(Continued)

*Primary Examiner* — Adam D Rogers
(74) *Attorney, Agent, or Firm* — Dickinson Wright PLLC

(57) ABSTRACT

A protective covering for a shaft output of a transfer gearbox, comprising a solid, inelastic protective covering body, wherein the protective covering body has substantially the form of a frustoconical casing in order to surround a shaft in the region of the shaft output, having a first opening at a first axial end and a second opening at a second axial end, situated opposite from the first end, of the protective covering body, wherein the first opening is larger than the second opening, wherein the second opening is formed to surround the shaft, wherein, in the region of the first opening, a flange portion, lying at the top in the installed position, of the protective covering body is formed to be fastened to a housing of the transfer gearbox, wherein, in the region of the first opening, a portion, lying at the bottom in the (Continued)

installed position, of the protective covering body is formed to provide an outflow opening when the flange portion is fastened to the housing of the transfer gearbox.

14 Claims, 3 Drawing Sheets

(56) References Cited

FOREIGN PATENT DOCUMENTS

| | | | |
|---|---|---|---|
| DE | 102004012221 A1 | 11/2004 | |
| DE | 102015122519 A1 | 6/2016 | |
| DE | 102016211663 A1 | 1/2017 | |
| GB | 1119618 A * | 7/1968 | ............... F16P 1/04 |
| JP | 2008254598 A | 10/2008 | |
| KR | 101476540 B1 * | 12/2014 | |

* cited by examiner

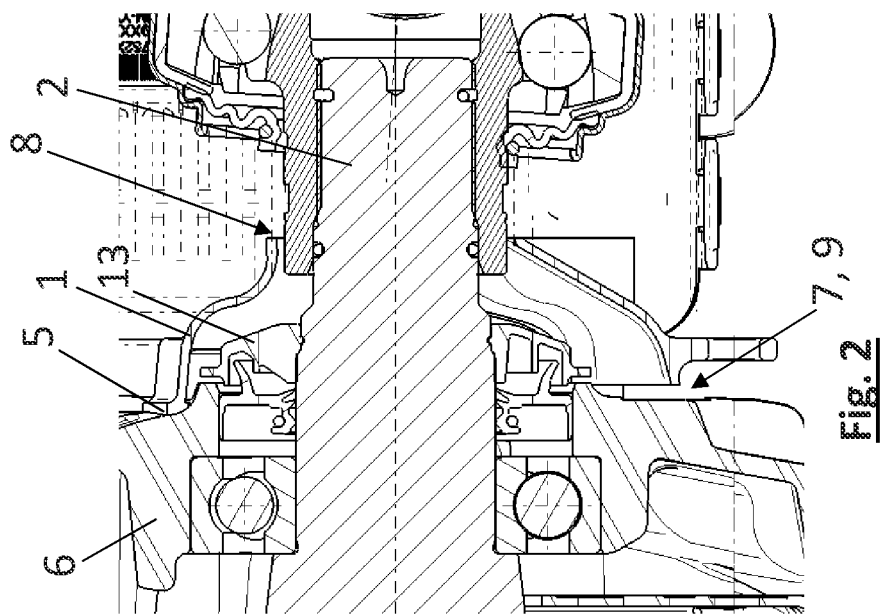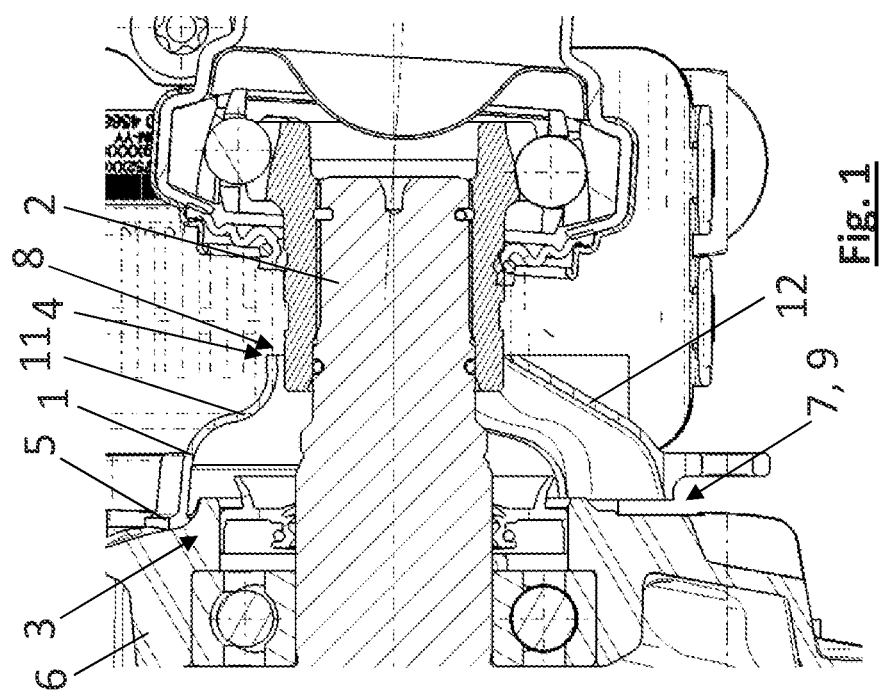

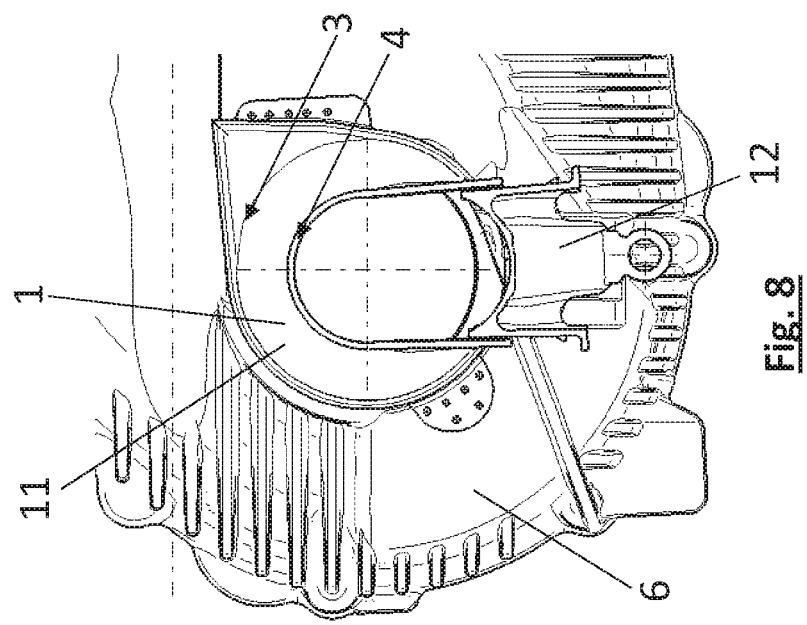
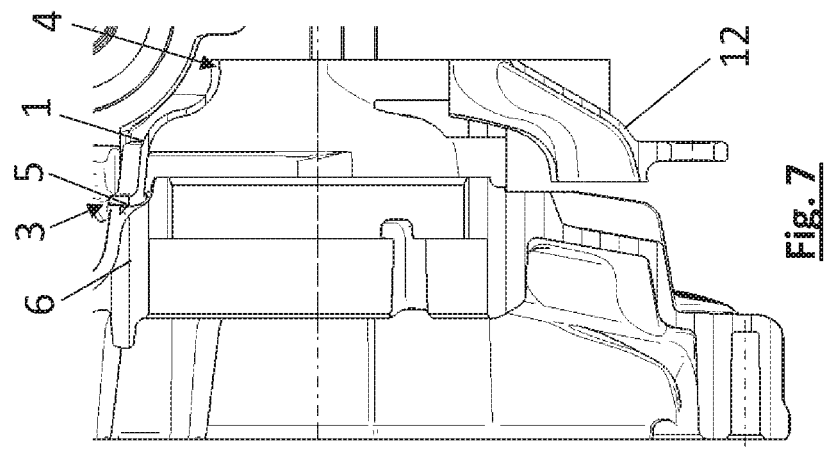
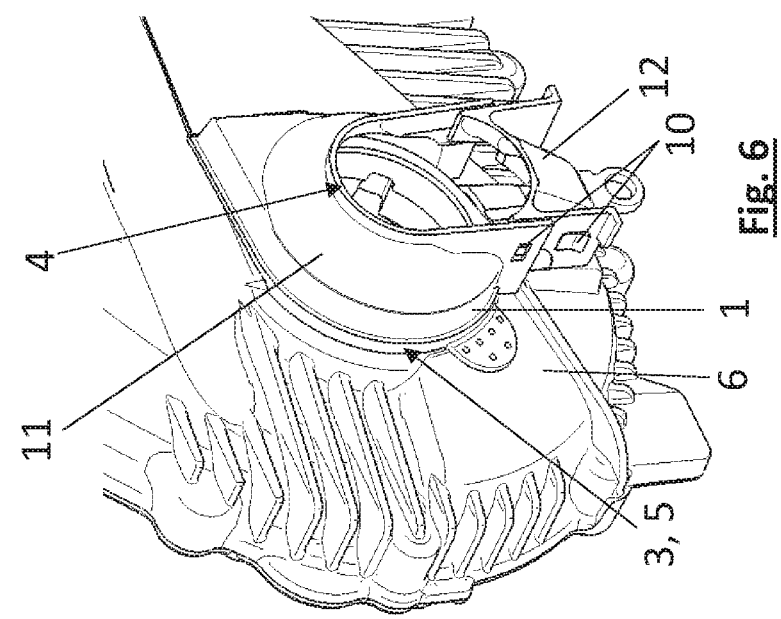

PROTECTIVE COVERING

CROSS-REFERENCE TO RELATED APPLICATIONS

This patent application claims priority to German Patent Application Serial No. 102019205870.1 filed Apr. 24, 2019, which is hereby incorporated by reference in its entirety.

FIELD OF THE INVENTION

The present invention relates to a protective covering for a shaft output of a transfer gearbox, and to a transfer gearbox comprising a shaft at a shaft output of the transfer gearbox and a protective covering for the shaft output.

BACKGROUND OF THE INVENTION

This section provides information related to the present disclosure which is not necessarily prior art Transfer gearboxes in motor vehicles serve to split an input torque over a plurality of outputs. The input torque and/or the output torques can be guided via rotatably mounted shafts respectively into or out of the transfer gearbox. Such shaft outputs of a transfer gearbox have the problem that, for example, water or dirt could penetrate into the transfer gearbox and may damage the gearbox. Therefore, it is known to implement protective measures in the region of a shaft output of a transfer gearbox in order to prevent the penetration of water. In particular, seals are used at the shaft outputs in order to prevent the penetration of water, for example three sealing rings at the three shaft outputs.

Known protective measures for preventing an ingress of water into a transfer gearbox are also, for example, the use of an underbody protection system in this region or the use of centrifugal discs, which outwardly centrifuge water by way of a rotating element and thus prevent the ingress of water through a radially inwardly lying clearance.

It is also known to use in the region of shaft outputs deformable and/or elastic folding sleeves that bear as tightly as possible against components of the transfer gearbox and partially also against the shafts themselves, in order to prevent the ingress of water.

DE 706 519 C discloses a folding sleeve made from rubber for the sealing of oscillating half-axles of motor vehicles with respect to the drive housing, having a longitudinally running separation joint, wherein the separation joint of the sleeve is held together by a fully separable zip fastener.

SUMMARY OF THE INVENTION

This section provides a general summary of the disclosure, and is not a comprehensive disclosure of its full scope or all of its features It is an object of the invention to specify a protective covering for a shaft output of a transfer gearbox, which effectively prevents the ingress of water into the transfer gearbox and can be manufactured and assembled cost-effectively. A further object is to specify a transfer gearbox, comprising a shaft output and a protective covering for the shaft output, with the stated advantages.

The protective covering comprises a solid, inelastic protective covering body. The protective covering may consist in particular of a solid plastic, of sheet metal or of aluminium. The protective covering body has substantially the form of a frustoconical casing in order to surround a shaft in the region of the shaft output, having a first opening at a first axial end and a second opening at a second axial end, situated opposite from the first end, of the protective covering body, wherein the first opening is larger than the second opening. The second opening or a periphery of the second opening is formed to surround the shaft. In the region of the first opening, a flange portion, lying at the top in the installed position, of the protective covering body is formed to be fastened to a housing of the transfer gearbox. A portion, lying at the bottom in the region of the first opening in the installed position, of the protective covering body is formed to provide an outflow opening when the flange portion is fastened to the housing of the transfer gearbox.

According to the invention, although a protective covering body is formed similarly to a folding sleeve in terms of form, it is not formed to be deformable or elastic in terms of either form or material. Rather, the solid protective covering body is formed such that it can be fastened to the gearbox housing at the axial end of the transfer gearbox via a flange at the top in the installed position; however, in this case, an outflow opening remains at the bottom in the installed position, either as a gap towards the gearbox housing or as an opening formed in the protective covering body.

The structure made from a solid, inelastic material makes it possible to produce and assemble the protective covering easily and cost-effectively. The configuration according to the invention does not make it possible to completely prevent an ingress of water into the interior of the protective covering; however, an outflow opening is formed at the bottom of the protective covering such that water penetrating into the protective covering can flow out downwardly via the outflow opening before it ingresses into the transfer gearbox.

In the region of the second opening, a peripheral portion of the protective covering body is preferably formed such that it surrounds the shaft in a non-sealing manner, such that a gap is formed at least in certain portions between the peripheral portion of the protective covering body and the shaft. The gap is particularly preferably formed around the full periphery between the peripheral portion of the protective covering body and the shaft. By way of such a gap between the protective covering body and the shaft, the shaft can rotate freely, without grinding losses. Penetrating water can be discharged again via the outflow opening.

Preferably, in the region of the first opening, a portion, lying at the bottom in the installed position, of the protective covering body is formed such that, when the flange portion is fastened to the housing of the transfer gearbox, a gap exists between the protective covering body and the housing of the transfer gearbox, such that the gap forms the outflow opening.

As an alternative or in addition, in the region of the first opening, a portion, lying at the bottom in the installed position, of the protective covering body may comprise the outflow opening, that is to say the opening may be formed in the protective covering body.

The protective covering body or an upper protective covering body part may be adhesively bonded and/or screwed and/or fastened in a form-fitting manner, in particular clip-fastened, to the housing of the transfer gearbox.

The protective covering body is preferably of a multi-part form, particularly preferably of a two-part form, wherein the parts of the protective covering body can preferably be clip-fastened to one another.

The protective covering body may comprise an upper protective covering body part, which forms the flange portion, lying at the top in the installed position, of the protective covering body, and may comprise a lower protective covering body part, which forms that portion, lying at the bottom in the installed position, of the protective covering body which provides the outflow opening when the flange portion is fastened to the housing of the transfer gearbox.

The upper protective covering body part may then be adhesively bonded or fastened in another way to the housing of the transfer gearbox via the flange portion. The lower protective covering body part can be clip-fastened to the upper protective covering body part.

According to the invention, a transfer gearbox may comprise a shaft and a protective covering, as described above, at the shaft output of the transfer gearbox such that the protective covering body surrounds the shaft in the region of the shaft output, wherein the second opening surrounds the shaft, wherein, in the region of the first opening, the flange portion, lying at the top in the installed position, of the protective covering body is fastened, preferably adhesively bonded, to the housing of the transfer gearbox, wherein, in the region of the first opening, the portion, lying at the bottom in the installed position, of the protective covering body provides the outflow opening. In this case, a gap preferably exists between the protective covering body and the housing of the transfer gearbox such that the gap forms the outflow opening.

In the region of the second opening, a peripheral portion of the protective covering body preferably surrounds the shaft in a non-sealing manner, such that a gap is formed at least in certain portions between the peripheral portion of the protective covering body and the shaft, particularly preferably a gap is formed around the full periphery between the peripheral portion of the protective covering body and the shaft.

The flange portion, lying at the top in the region of the first opening in the installed position, of the protective covering body is preferably adhesively bonded to the housing of the transfer gearbox.

Within the protective covering body, a centrifugal disc may also be fastened to the shaft in order to remove water from the protective covering body, in particular through the outflow opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a sectional view of a protective covering according to the invention in the installed state with a shaft.

FIG. 2 is a sectional view of a further protective covering according to the invention in the installed state with a shaft.

FIG. 6 is a three-dimensional representation of a protective covering according to the invention according to FIG. 3, but during installation.

FIG. 7 is a sectional view of the protective covering according to the invention during installation according to FIG. 6.

FIG. 8 is a lateral representation of the protective covering according to the invention during installation according to FIG. 6.

DETAILED DESCRIPTION OF THE INVENTION

Figure 5:
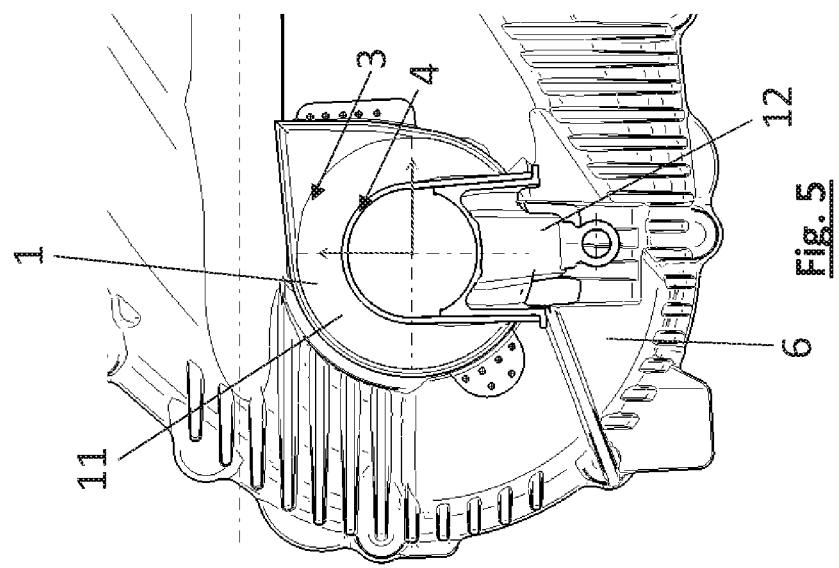
FIG. 5 is a lateral representation of the protective covering according to the invention in the installed state without a shaft according to FIG. 3.

FIG. 1 shows a transfer gearbox according to the invention, comprising a housing 6 of the transfer gearbox and a shaft 2 at a shaft output of the transfer gearbox as well as a protective covering according to the invention.

The protective covering for the shaft output of the transfer gearbox comprises a solid, inelastic protective covering body 1, preferably made from plastic, which has substantially the form of a frustoconical casing in order to surround the shaft 2 in the region of the shaft output, having a larger first opening 3 at a first axial end and a smaller second opening 4 at a second axial end, situated opposite from the first end, of the protective covering body 1.

The second opening 4 surrounds the shaft 2 in a non-sealing manner, such that a gap 8 is formed at least in certain portions between the peripheral portion of the protective covering body 1 and the shaft 2, preferably a gap 8 is formed around the full periphery between the peripheral portion of the protective covering body 1 and the shaft 2.

In the region of the larger, first opening 3, lying at the top in the installed position, a flange portion 5 of the protective covering body 1 that is adhesively bonded to the housing 6 of the transfer gearbox is formed. In addition to a permanent adhesive bond of the flange portion 5, in this region the protective covering may be fastened to the housing 6, for example by means of double-sided adhesive tape, during assembly.

In the region of the first opening 3, lying at the bottom in the installed position, a portion of the protective covering body 1 is formed such that, when the flange portion 5 is fastened to the housing 6 of the transfer gearbox, an outflow opening 7 in the form of a gap 9 is formed between the protective covering body 1 and the housing 6 of the transfer gearbox.

As can be seen in the embodiment of the transfer gearbox in FIG. 2, within the protective covering body 1 a centrifugal disc 13 may be fastened to the shaft 2.

Figure 4:
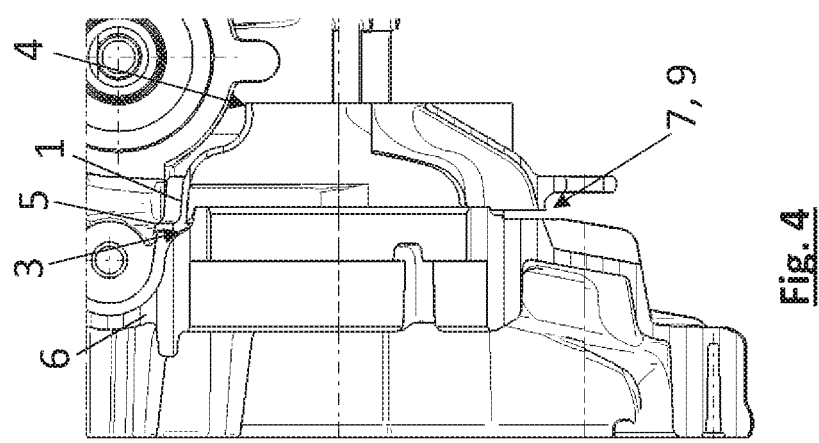
FIG. 4 is a sectional view of the protective covering according to the invention in the installed state without a shaft according to FIG. 3.
Figure 3:
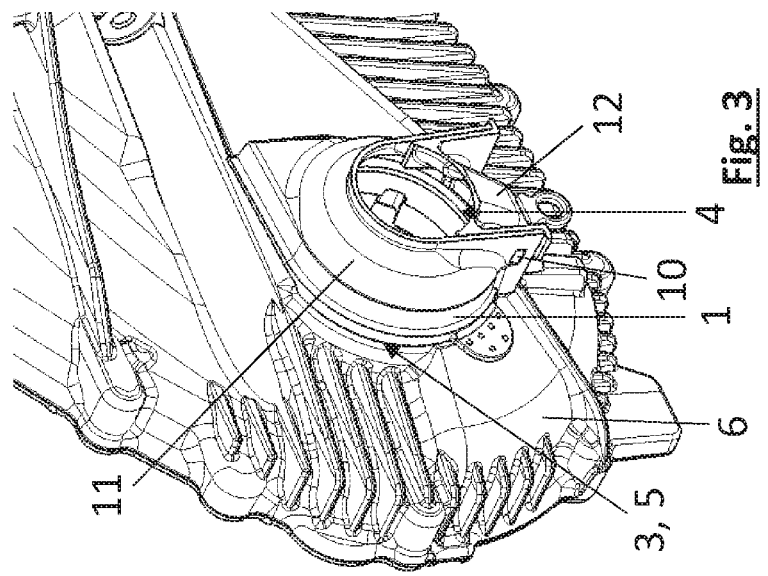
FIG. 3 is a three-dimensional representation of a protective covering according to the invention in the installed state without a shaft.

FIG. 3 to FIG. 8 show that the protective covering body 1 may be of two-part form. FIG. 6 to FIG. 8 show the two parts of the protective covering body 1 during assembly, before they are connected to one another, and FIG. 3 to FIG. 5 show the protective covering after connection has taken place, such that the two parts of the protective covering body 1 are clip-fastened to one another by means of a clip connection 10.

The protective covering body 1 comprises an upper protective covering body part 11, which forms the flange portion 5, lying at the top in the installed position, of the protective covering body 1, and comprises a lower protective covering body part 12, which forms that portion, lying at the bottom in the installed position, of the protective covering body 1 which provides the outflow opening 7 when the flange portion 5 is fastened to the housing 6 of the transfer gearbox. The upper protective covering body part 11 and the lower protective covering body part 12 are clip-fastened to one another by means of the clip connection 10.

The protective covering may be centred, for example, via lugs distributed on the periphery of the transfer gearbox. It is possible for only the upper protective covering body part 11 to be fastened, in particular adhesively bonded, to the housing 6 of the transfer gearbox. The lower protective covering body part 12 may be fastened only to the upper protective covering body part 11. Towards the housing 6, a gap 9 may be easily formed as a result on the lower protective covering body part 12 as outflow opening 7.

LIST OF REFERENCE DESIGNATIONS

1 Protective covering body
2 Shaft
3 First opening
4 Second opening
5 Flange portion
6 Housing
7 Outflow opening
8 Gap
9 Gap
10 Clip connection
11 Upper protective covering body part
12 Lower protective covering body part
13 Centrifugal disc

What is claimed is:

1. A protective covering for a shaft at a shaft output of a transfer gearbox, the protective covering comprising a solid, inelastic protective covering body, wherein the protective covering body has a substantially frustoconical shape in order to surround the shaft in a region of the shaft output, the protective covering body having a first opening at a first axial end of the protective covering body and a second opening at a second axial end of the protective covering body situated opposite the first axial end, wherein the first opening is larger than the second opening, wherein the second opening is formed to surround the shaft, wherein a top of the protective covering body in a region of the first opening includes a flange portion configured to be fastened to a housing of the transfer gearbox in an installed position, wherein a bottom of the protective covering body in the region of the first opening is formed such that when the flange portion is fastened to the housing of the transfer gearbox in the installed position, a gap exists between the protective covering body and the housing of the transfer gearbox such that the gap forms an outflow opening.

2. The protective covering according to claim 1, wherein in a region of the second opening, a peripheral portion of the protective covering body is formed such that the peripheral portion surrounds the shaft in a non-sealing manner, such that an annular gap is formed between the peripheral portion of the protective covering body and the shaft around a full periphery of the peripheral portion of the protective covering body.

3. The protective covering according to claim 1, wherein the protective covering body is comprised of two parts being clip-fastened to one another.

4. The protective covering according to claim 1, wherein the protective covering body comprises an upper protective covering body part which forms the flange portion at the top of the protective covering body in the installed position, and wherein the protective covering body further comprises a lower protective covering body part at the bottom of the protective covering body in the installed position which provides the outflow opening when the flange portion is fastened to the housing of the transfer gearbox.

5. A transfer gearbox, comprising a shaft at a shaft output of the transfer gearbox, and a protective covering body extending between a first opening and a second opening opposite the first opening, wherein the first and second openings surround the shaft, wherein the protective covering body includes a flange portion at a top of the protective covering body at a region of the first opening, the flange portion configured to be fastened to a housing of the transfer gearbox when in an installed position, wherein a bottom of the protective covering body at the region of the first opening is configured to define a gap between the protective covering body and the housing of the transfer gearbox when the protective covering body is in the installed position such that the gap forms an outflow opening.

6. The transfer gearbox according to claim 5, wherein the flange portion of the protective covering body is adhesively bonded to the housing of the transfer gearbox.

7. The transfer gearbox according to claim 5, wherein in a region of the second opening, a peripheral portion of the protective covering body surrounds the shaft in a non-sealing manner, such that an annular gap is formed between the peripheral portion of the protective covering body and the shaft around a full periphery of the protective covering body between the peripheral portion of the protective covering body and the shaft.

8. The transfer gearbox according to claim 5, wherein a centrifugal disc is fastened to the shaft within the protective covering body.

9. A protective covering for covering a shaft at a shaft output of a transfer gearbox, comprising:
   a solid, inelastic protective covering body having a substantially frustoconical shape and configured to surround the shaft in a region of the shaft output;
   the protective covering body extending along an axis between a first opening at a first axial end and a second opening at a second axial end opposite the first axial end, wherein the first opening is larger than the second opening;
   the protective covering body including a flange portion extending radially relative to the axis at a top of the protective covering body at a region of the first opening for being fastened to a housing of the transfer gearbox in an installed position; and
   a portion of a bottom of the protective covering body at the region of the first opening being formed such that when the flange portion is fastened to the housing of the transfer gearbox a gap is defined between the protective covering body and the housing of the transfer gearbox such that the gap forms an outflow opening.

10. The protective covering as set forth in claim 9, wherein a peripheral portion of the protective covering body is formed in a region of the second opening such that the peripheral portion surrounds the shaft with an annular gap formed between the peripheral portion and the shaft around a full periphery of the shaft such that the peripheral portion surrounds the shaft in a non-sealing manner.

11. The protective covering as set forth in claim 9, wherein the protective covering body is comprised of two parts that are clip-fastened to one another.

12. The protective covering according to claim 9, wherein the protective covering body comprises an upper protective covering body part which forms the flange portion at the top of the protective covering body in the installed position, and wherein the protective covering body further comprises a lower protective covering body part at the bottom of the protective covering body in the installed position which provides the outflow opening when the flange portion is fastened to the housing of the transfer gearbox.

13. The transfer gearbox according to claim 9, wherein the flange portion of the protective covering body is adhesively bonded to the housing of the transfer gearbox.

14. The transfer gearbox according to claim 9, wherein a centrifugal disc is fastened to the shaft within the protective covering body.

* * * * *